Nov. 13, 1962  L. D. EMERY, JR  3,063,867
DEPOSITION AND MEASUREMENT OF LAYER THICKNESS
Filed Dec. 16, 1958
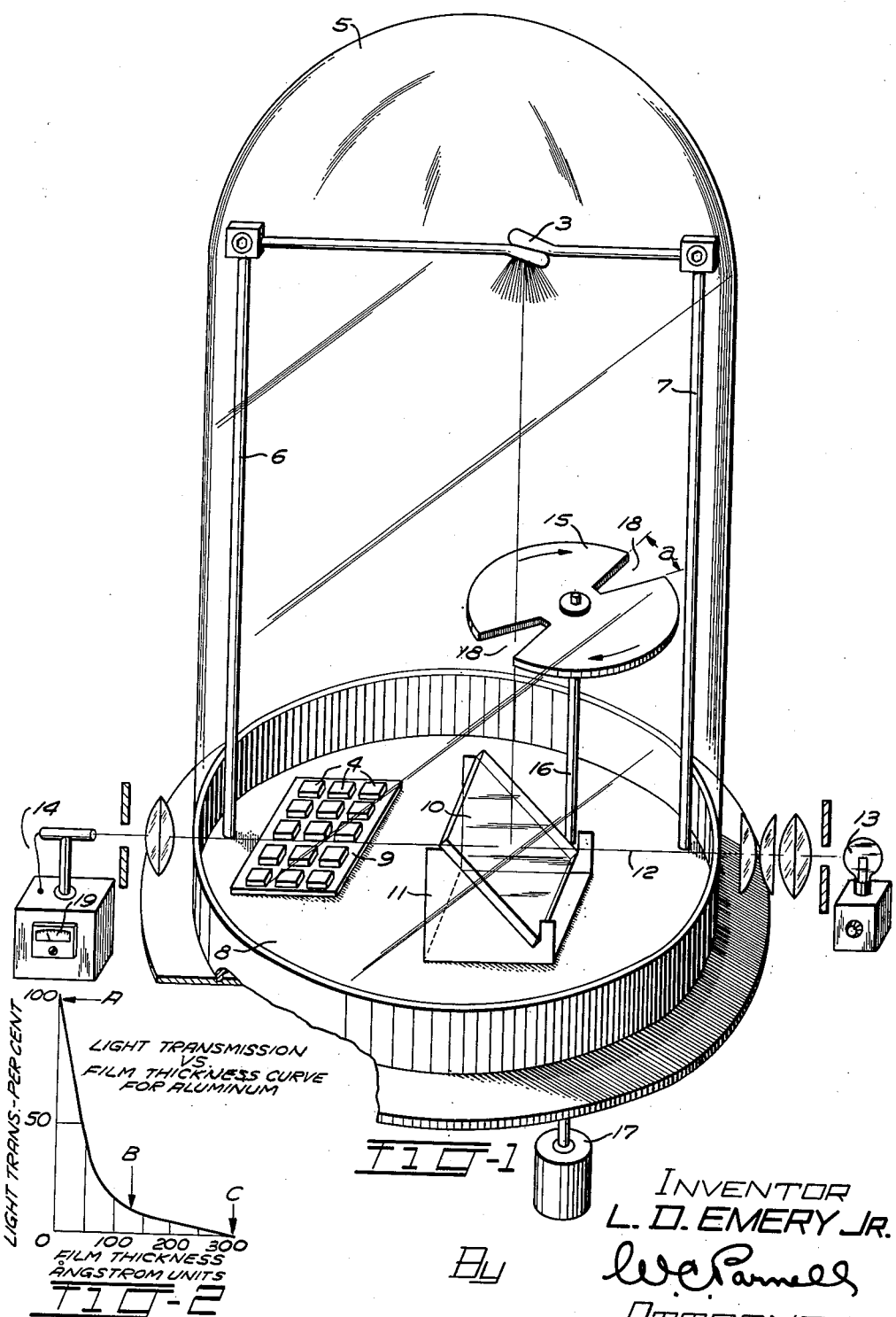
INVENTOR
L. D. EMERY Jr.

United States Patent Office 3,063,867
Patented Nov. 13, 1962

3,063,867
DEPOSITION AND MEASUREMENT OF LAYER THICKNESS
Loring D. Emery, Jr., Reading, Pa., assignor to Western Electric Company, Incorporated, New York, N.Y., a corporation of New York
Filed Dec. 16, 1958, Ser. No. 780,898
8 Claims. (Cl. 117—93)

This invention relates to coating articles by vapor deposition and particularly to a method and apparatus for accurately measuring the thickness of such coatings during the deposition thereof.

In the fabrication of the high-frequency semiconductor devices such as transistors, prescribed thicknesses of metals such as gold and aluminum are deposited on and bonded to semiconductor wafers. In order that uniform electrical characteristics may be realized, it is necessary to accurately control the thickness of such deposited metals. These coatings or films may range from extremely thin, substantially transparent, to heavy and opaque. Various optical systems have been devised for monitoring the thickness of semi-transparent, vapor deposited metal coatings. One of the more accurate methods involves passing a concentrated beam of light to a photo-sensitive indicator through a transparent dummy plate located in the metal vaporizing chamber wherein articles to be coated are placed. Like amounts of metal are deposited on the surfaces of the dummy plate and the articles so that by measuring the change in intensity of the light transmitted through the dummy plate, the thickness of the metal deposited on the articles may be determined. While satisfactory for measuring semi-transparent coatings, the method cannot be used where the desired coating is substantially transparent and there is insufficient change in the intensity of the beam of light to be detected or where the desired coating is so thick that it completely blocks the beam of light.

The object of this invention is the accurate measurement of such deposited coatings ranging from the extremely thin, substantially transparent, to the thick and opaque.

According to the general features of the invention, the thickness of the coating or film deposited on the surface of an article is monitored by passing a beam of light to a photo-sensitive indicator through a transparent plate having a surface thereof exposed to the action of the vaporized coating material source. The path between the source and one of the surfaces is periodically blocked so that only a quantity corresponding to a determinable percentage of the coating material is transmitted through the unobstructed path is passed on to the surface in the periodically blocked path. In the case where the desired film is substantially transparent, the path between the source and the article to be coated is interrupted such that a larger, accurately measurable quantity of the vaporized coating material is deposited on the surface of the transparent plate. In the case where the desired thickness is such that it is opaque, the path between the source and the transparent plate is periodically interrupted. In either case the thickness of the vaporized material deposited on the transparent plate corresponding to the desired film thickness on the articles is such that the transmitted light is sufficient to actuate the indicator with a desired degree of accuracy.

In a preferred embodiment of the invention, the path between the source and either the plate or the articles is periodically interrupted by a slotted chopper disc rotated by a constant speed driver. The size and number of slots or openings are selected so that the ratio of the open to solid portions between the source and its target is in the same ratio as that required between the realtive thicknesses of the films for rendering the indicator operative when the film thickness on the articles reaches the desired value.

These and other features of the invention will be more clearly understood when taken in conjunction with the accompanying drawing, in which:

FIG. 1 is a preferred embodiment of the invention showing a bell jar, metal-vapor deposition chamber with the transparent plate and articles to be coated positioned for measuring thick, light-blocking coatings on the articles, and FIG. 2 is a curve showing typical, light transmission versus film thickness curves for aluminum.

Referring now to the drawing, a vaporizing element 3 containing a supply or source of metal to be deposited on articles 4, is mounted in a conventional glass bell jar, vacuum chamber 5. Structure for evacuating the bell jar, as well as deflection shields for the source to prevent coating the internal surfaces of the bell jar are not shown in the drawing since they are well known in the art. It is to be understood that the element 3, mounted between the upper ends of supports 6 and 7, is connected to a suitable source of electrical energy so that it can be energized or heated to evaporate the coating material therefrom. The articles 4 on plate 9 on the bell jar base 8 are exposed to the source of evaporated metal at element 3 through an unobstructed path. A transparent glass plate 10 is supported at an angle of substantially 45 degrees with the vertical in a holder 11 on the base 8 so that a beam of light 12 from an adjustable lamp 13, external the bell jar, will pass therethrough also at a 45 degree angle to a photo-sensitive element of a light intensity indicator 14 on the other side of and external the bell jar.

A chopper disc 15, supported at the end of a rotatable shaft 16 driven by a constant speed motor 17 mounted below the base 8, is positioned such that vaporized metal from the source at element 3, deposited on the area of the transparent plate through which the light beam passes, is interrupted whenever the solid portions of the disc are moved therebetween. Vaporized metal from the source passes on to the light transmitting area of the plate only when the segment-shaped slots 18 occupy positions between it and the source. The portion of the metal radiating from the source of the element 3 in the direction of the light beam transmission area on the plate 10 that is not blocked is equal to the product of the number of slotted apertures in the disc fifteen times the angle "a" in degrees of the slotted segments, divided by 360. In the present embodiment with two apertures of 30 degrees each, this fraction is equal to $$\frac{2 \times 30}{360}$$

or one-sixth. This means that one-sixth as much vaporized metal passes through the chopper disc to the pertinent area of the glass plate than passes on to the unobstructed articles 4. This relationship is independent of the angular velocity of the disc provided the disc is rotated at a uniform speed. Since the vaporized metal passes in straight lines from the source, the thickness of the film deposited on the 45 degree inclined surface of the plate 10 is less than if the plate was perpendicular to the radiating metal vapors. This is compensated for by passing the light beam 12 through the plate 10 at 45 degrees. The amount of light transmitted through the plate then will be the same as passing a light beam through a plate with one-sixth the film thickness of that deposited on articles 4 lying with their principal surfaces substantially perpendicular the vaporizing metal source. For purposes of clarity, the drawing is not drawn to scale, actually the distance from the element 3 to the base 8 is sufficiently large that the vaporized metal can be considered as falling in parallel beams through the chopper disc openings and on the faces of the articles 4 and substantially perpendicular thereto.

The indicator 14 may comprise a photo cell connected in circuit with a microammeter 19 calibrated from zero to one hundred. In practice, the input current from the lamp filament 13 is adjusted to give a full scale deflection of 100 on the microammeter with no metal deposited on the plate 10. The system for this condition then indicates 100 percent transmission. When metal is evaporated from the source by the element 3 and the chopper is rotated, evaporated metal from the source passes through the chopper openings and is deposited on the glass slide. Light from the lamp is therefore reduced in intensity in passing through the coated slide and less current is generated by the photo-sensitive device of the indicator 14, resulting in a lower reading on the microammeter. For the metal aluminum, the current reading on the microammeter is related to the thickness of the deposited film by a curve similar to the one disclosed in FIG. 2. The reading in microamperes on the meter 19 then is equal to the corresponding number on the vertical scale in percent. These curves are obtained empirically for the particular coating metal and the angular relationship of the plate 10 to the radiating source at element 3 and the light beam 12. The data for the curve may be obtained by coating articles on the plate 9 as well as the glass plate 10 with the chopper disc stopped in one of its unobstructing positions. The process can be stopped periodically and absolute measurements made of the coatings produced on the articles 4 corresponding to the indications on meter 19.

The chopper permits using the indicator 14 in its most sensitive region when the films deposited on the articles 4 reach the prescribed thickness. Referring to the curve it can be seen that the sensitivity of the light measuring system decreases as the thickness of the deposited metal approaches 125 angstrom units (illustrated by point "B" on the curve). At point "C" the indicator is worthless because no further measurement is possible as no light is passed through the film. The best sensitivity obtainable with this indicator is when it is operated in the "A—B" portion of the curve. Usual film thicknesses for semiconductor application lie in the range between 1000 and 10,000 angstrom units. Consequently, the chopper is proportioned so that for a required amount of evaporated material uninterruptedly deposited on the articles 4, a sufficently small fraction of the desired amount falling on the slide 10 produces a coating thereon whose transparency operates the indicator 14 in the "A—B" region. For example, where a film of aluminum of 1250 angstrom units is to be deposited on articles 4, the chopper disc is made with two open segments having angles "a" equal to eighteen degrees each. With the light intensity adjusted such that the meter 19 indicates 100 microamperes ("100" on the vertical scale of FIG. 2) before deposition, aluminum is evaporated on the articles 4 and the plate 10 until the microammeter 19 indicates 10 microamperes ("10" on the vertical scale). The evaporation is then stopped by opening the heating circuit for the element 3. Referring to the curve of FIG. 2, it can be seen that the ten percent transmission corresponds to a film of 125 angstrom units across the light transmission path and, since this is only one-tenth of the film deposited on the articles, the total material deposited on the articles 4 will be ten times 125 or 1250 angstrom units thick.

In the other application for this structure to accurately measure the thickness of deposited materials where the light transmission therethrough is nearly 100 percent, the positions of the plate 9 with the articles 4 and the transparent plate 10 and its holder 11 would be exchanged. In such case the chopper is located between the source in the element 3 and the articles to be coated and only a small percentage of the total amount of metal deposited on the transparent plate 10 would be deposited thereon. In this way, the thicker, denser film produced on the plate 10 is used to measure the smaller deposition on the articles 4. The indicator 14 may then be operated at its most sensitive region.

While in this preferred embodiment the ratio between the amount of vaporized material passing on to the glass plate 10 and the articles 4 is determined by the proportioning of a rotating chopper disc 15, other interrupting or blocking devices may be utilized. For example, a periodically reciprocating plate could be moved in and out of the path of the vaporized material and the reciprocating speed could be changed to vary the ratio of the amount of material deposited on the periodically obstructed surface to the amount deposited on the unobstructed one.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A method of depositing and measuring the thickness of a film deposited on the surface of an article from a source of coating material which comprises exposing the surface of the article and the surface of a transparent plate to the source to receive coating material thereon, passing a concentrated beam of light through the transparent plate and upon a light sensitive indicating device, and periodically blocking and unblocking in successively occurring cycles throughout the entire period of deposition the supply of the coating material to one of the surfaces so that the thicknesses of the deposited coatings on the surfaces are in a desired ratio other than unity.

2. A method of depositing and measuring the thickness of a coating material deposited on the surface of an article positioned in a vapor deposition chamber which comprises positioning a transparent plate in the chamber with the article, passing a concentrated beam of light through the transparent plate and upon a light sensitive indicating device while coating material is deposited on a surface of the article and upon a surface of the transparent plate, and periodically blocking and unblocking in successively occurring cycles throughout the entire period of deposition the supply of the coating material to one of the surfaces so that the thicknesses of the deposited coatings on the surfaces are in a desired ratio other than unity.

3. A method of depositing and measuring the thickness of an opaque film deposited on the surface of an article positioned in a vapor deposition chamber by the evaporation of coating material from a source comprising, positioning a transparent plate in the chamber with the article, passing a concentrated beam of light through the transparent plate and upon a light sensitive indicating device while coating material is deposited on a surface of the article and upon a surface of the transparent plate, and repeatedly blocking and unblocking in successively occurring cycles throughout the entire period of deposition the supply of the coating material to the surface of the transparent plate so that the thicknesses of the deposited coatings on the surface are in a desired ratio considerably less than unity and the thickness of the film deposited on the plate is sufficiently transparent when the desired opaque film thickness is deposited on the article for actuating the indicating device.

4. A method of depositing and measuring the thickness of a substantially transparent film deposited on the surface of an article positioned in a vapor deposition chamber by the evaporation of coating material from a source comprising, positioning a transparent plate in the chamber with the article so that a surface thereof is exposed to the source to receive coating material thereon, passing a concentrated beam of light through the transparent plate and upon a light sensitive indicating device while coating material is depositing on the surfaces, and repeatedly blocking and unblocking in successively occurring cycles throughout the entire period of deposition the supply of the coating material to the surface of the article so that the thicknesses of the deposited coatings on the surfaces are in a desired ratio considerably less than unity and the film deposited on the plate is sufficiently dense when the desired substantially transparent film thickness is deposited on the article for actuating the indicating device.

5. A system for depositing and measuring the thickness of films deposited on a surface of an article from a source of coating material which comprises, a transparent plate, means for supporting an article to be coated and the transparent plate in the field of the source so that the surface to be coated and a surface of the plate receive coating material thereon, means for repeatedly interrupting in successively occurring cycles throughout the entire period of deposition the coating material from impinging on one of the surfaces, and means for indicating the degree of transparency of the coating material deposited on the transparent plate.

6. A system according to claim 5 in which the blocking means comprise a slotted disc and means for rotating the disc at a substantially constant speed, the disc being positioned between the stationary source and said one of the surfaces so that coating material directed toward said surface is periodically blocked in successively occurring cycles throughout the entire period of deposition by the solid portions of the disc.

7. In a vapor deposition coating apparatus having a vacuum chamber, an element for evaporating coating material from a source, transparent chamber wall portions and means for supporting an article to be coated in the chamber so that the surface thereof to be coated is exposed to the evaporating element, means for measuring the thickness of a film deposited on the surface of the article comprising a light intensity indicating device, means for transmitting a beam of light through the transparent chamber wall portions to the indicating device, a transparent plate, means for positioning the transparent plate in the chamber so that a surface thereof is exposed to the evaporating element and is in the path of the beam of light, and means for repeatedly blocking and unblocking in successively occurring cycles throughout the entire period of deposition material emitted from the source to one of the surfaces.

8. A system according to claim 7 in which the blocking means comprise a slotted disc and means for rotating the disc at a substantially constant speed with the disc being positioned between the evaporating element and said one of the surfaces so that coating material directed toward said surface is periodically blocked in successively occurring cycles throughout the entire period of deposition by the solid portions of the disc.

References Cited in the file of this patent

UNITED STATES PATENTS

| | | |
|---|---|---|
| 2,239,452 | Williams et al. | Apr. 22, 1941 |
| 2,338,234 | Dimick | Jan. 4, 1944 |
| 2,384,209 | Sukumlyn | Sept. 4, 1945 |
| 2,433,635 | Sukumlyn | Dec. 30, 1947 |
| 2,675,114 | Barkley | Apr. 20, 1954 |
| 2,695,852 | Sparks | Nov. 30, 1954 |
| 2,745,773 | Weimer | May 15, 1956 |